(12) United States Patent
Yoshida et al.

(10) Patent No.: US 12,454,308 B2
(45) Date of Patent: Oct. 28, 2025

(54) MOTOR CONTROL DEVICE, ELECTRIC ACTUATOR PRODUCT, AND ELECTRIC POWER STEERING DEVICE

(71) Applicant: NSK LTD., Tokyo (JP)

(72) Inventors: Keita Yoshida, Tokyo (JP); Yuzuru Hoshi, Fujisawa (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 19/105,569

(22) PCT Filed: May 19, 2023

(86) PCT No.: PCT/JP2023/018754
§ 371 (c)(1),
(2) Date: Feb. 21, 2025

(87) PCT Pub. No.: WO2024/053167
PCT Pub. Date: Mar. 14, 2024

(65) Prior Publication Data
US 2025/0263112 A1    Aug. 21, 2025

(30) Foreign Application Priority Data
Sep. 7, 2022 (JP) ................ 2022-142039

(51) Int. Cl.
*B62D 5/04* (2006.01)
(52) U.S. Cl.
CPC ........ *B62D 5/0463* (2013.01); *B62D 5/0409* (2013.01)
(58) Field of Classification Search
CPC .................. B62D 5/0463; B62D 5/0409
See application file for complete search history.

(56) References Cited

U.S. PATENT DOCUMENTS

| 6,335,604 B1 | 1/2002 | Kataoka |
| 2017/0005600 A1 | 1/2017 | Takesaki et al. |

FOREIGN PATENT DOCUMENTS

| JP | 2000-333488 A | 11/2000 |
| JP | 2008-301656 A | 12/2008 |

(Continued)

OTHER PUBLICATIONS

Written Opinion of International Preliminary Examining Authority (PCT/IPEA/408) dated Sep. 19, 2023.

(Continued)

*Primary Examiner* — Jacob D Knutson
(74) *Attorney, Agent, or Firm* — Sughrue Mion, PLLC (57) ABSTRACT

A motor control device including: a current command value calculation unit configured to calculate a current command value for driving a motor; a current value detection unit configured to detect current flowing through the motor; a current control unit configured to output a first voltage command value according to deviation between a current detected value, the current detected value being a detected value of current detected by the current value detection unit, and the current command value; a voltage disturbance control unit configured to calculate a second voltage command value by adding output from a delay element to the first voltage command value and also input the second voltage command value to the delay element; and a driving circuit configured to drive the motor, based on the second voltage command value.

9 Claims, 10 Drawing Sheets

(56) References Cited

FOREIGN PATENT DOCUMENTS

| | | | | |
|---|---|---|---|---|
| JP | 2017-017899 | A | 1/2017 | |
| JP | 2017-175834 | A | 9/2017 | |
| JP | 2021-164377 | A | 10/2021 | |
| JP | 2022082083 | A * | 6/2022 | |
| KR | 20080057311 | A * | 6/2008 | ......... B62D 15/0245 |
| WO | WO-2018190086 | A1 * | 10/2018 | ........... B62D 5/0466 |
| WO | WO-2019171438 | A1 * | 9/2019 | .............. H02P 21/06 |

OTHER PUBLICATIONS

International Preliminary Report on Patentability(PCT/IPEA/409) dated Jul. 12, 2023.
Japanese Office Action dated Jul. 23, 2024 for corresponding Japanese Patent Application No. 2023-571868.
International Search Report for PCT/JP2023/018754 dated Jul. 11, 2023.
International Preliminary Report on Patentability issued Mar. 13, 2025 with translation of the Written Opinion in International Application No. PCT/JP2023/018754.

* cited by examiner

MOTOR CONTROL DEVICE, ELECTRIC ACTUATOR PRODUCT, AND ELECTRIC POWER STEERING DEVICE

CROSS REFERENCE TO RELATED APPLICATIONS

This application is a National Stage of International Application No. PCT/JP2023/018754 filed May 19, 2023, claiming priority based on Japanese Patent Application No. 2022-142039 filed Sep. 7, 2022.

TECHNICAL FIELD

The present invention relates to a motor control device, an electric actuator product, and an electric power steering device.

BACKGROUND ART

In PTL 1 described below, a technology for compensating for back electromotive voltage by estimating the back electromotive voltage, based on a back electromotive voltage constant and motor rotational speed and adding a correction value canceling the back electromotive voltage to a voltage command value (hereinafter, sometimes referred to as "feedforward-type back electromotive voltage compensation") is described.

CITATION LIST

Patent Literature

JP 2017-175834 A

SUMMARY OF INVENTION

Technical Problem

There has been a problem in that the feedforward-type back electromotive voltage compensation has a low robustness against disturbance factors, such as variation in motor characteristics caused by an individual difference of a motor to be used and change in physical properties due to temperature change or aging.

An object of the present invention is to provide a motor control device the robustness of which against disturbance factors, such as variation in motor characteristics caused by an individual difference of a motor to be used and change in physical properties due to temperature change or aging, is improved.

Solution to Problem

In order to achieve the above-described object, according to an aspect of the present invention, there is provided a motor control device including: a current command value calculation unit configured to calculate a current command value for driving a motor; a current value detection unit configured to detect current flowing through the motor; a current control unit configured to output a first voltage command value according to deviation between a current detected value, the current detected value being a detected value of current detected by the current value detection unit, and the current command value; a voltage disturbance control unit configured to calculate a second voltage command value by adding output from a delay element to the first voltage command value and also input the second voltage command value to the delay element; and a driving circuit configured to drive the motor, based on the second voltage command value.

According to another aspect of the present invention, there is provided an electric actuator product including: the motor control device described above; and a motor controlled by the motor control device.

According to still another aspect of the present invention, there is provided an electric power steering device including: the motor control device described above; and a motor controlled by the motor control device, wherein the electric power steering device provides a steering system of a vehicle with a steering assist force, using the motor.

Advantageous Effects of Invention

According to the present invention, it is possible to provide a motor control device the robustness of which against disturbance factors, such as variation in motor characteristics caused by an individual difference of a motor to be used and change in physical properties due to temperature change or aging, is improved.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

(Configuration)

Figure 1:
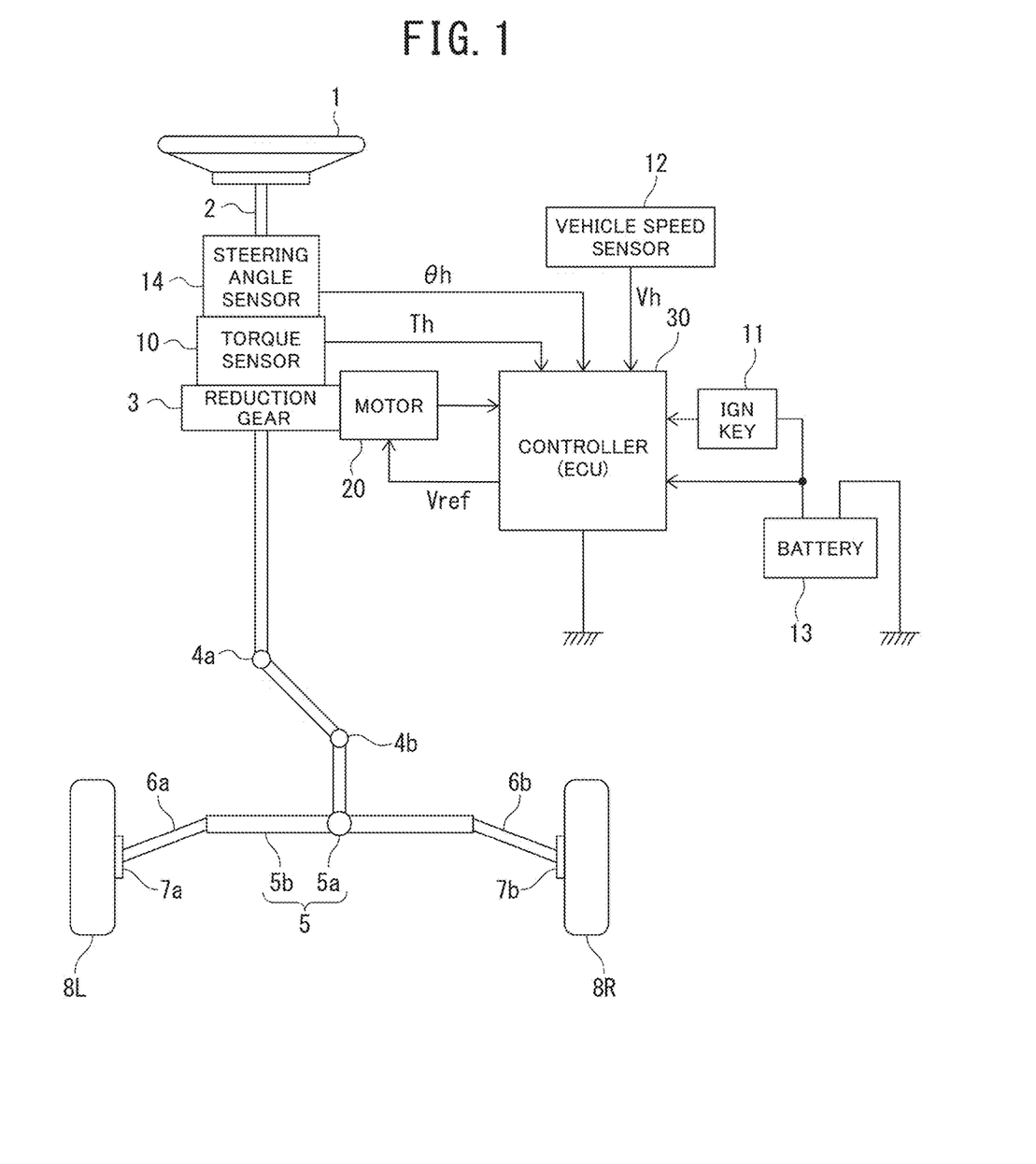
FIG. 1 is a configuration diagram illustrative of an outline of an example of an electric power steering device of an embodiment.

FIG. 1 is a configuration diagram illustrative of an outline of an example of an electric power steering device of an embodiment. A steering shaft (steering wheel shaft) 2 of a steering wheel 1 is connected to steered wheels 8L and 8R by way of a reduction gear (worm gear) 3 that constitutes a speed reduction mechanism, universal joints 4a and 4b, a pinion rack mechanism 5, and tie rods 6a and 6b and further via hub units 7a and 7b.

The pinion rack mechanism 5 includes a pinion 5a that is coupled to a pinion shaft to which steering force is transmitted from the universal joint 4b and a rack 5b that meshes with the pinion 5a, and converts rotational motion transmitted to the pinion 5a to linear motion in the vehicle width direction by means of the rack 5b. To the steering shaft 2, a torque sensor 10 configured to detect steering torque Th is disposed. To the steering shaft 2, a steering angle sensor 14 configured to detect a steering angle θh of the steering wheel 1 is also disposed.

A motor 20 configured to assist steering force of the steering wheel 1 is also connected to the steering shaft 2 via the reduction gear 3. To a controller 30 configured to control the electric power steering (EPS) device, power is supplied from a battery 13 and an ignition key signal is also input by way of an ignition (IGN) key 11.

Note that means for providing a steering assist force is not limited to a motor, and various types of actuators can be used.

The controller 30 is an electronic control unit (ECU) configured to perform calculation of a current command value of an assist control command, based on steering torque Th detected by the torque sensor 10, vehicle speed Vh detected by a vehicle speed sensor 12, and a steering angle θh detected by the steering angle sensor 14 and control current to be supplied to the motor 20 in accordance with a voltage control command value Vref obtained by performing compensation and the like on the calculated current command value.

Note that the steering angle sensor 14 is not an essential component and the steering angle θh may be calculated by adding a torsion angle of a torsion bar in the torque sensor 10 to a rotation angle acquired from a rotation angle sensor configured to detect a rotation angle of the rotation shaft of the motor 20.

In addition, a turning angle of the steered wheels 8L and 8R may be used in place of the steering angle θh. The turning angle may be detected by, for example, detecting a displacement amount of the rack 5b.

The controller 30 includes, for example, a computer including a processor and peripheral components, such as a storage device. The processor may be, for example, a central processing unit (CPU) or a micro-processing unit (MPU).

The storage device may include one of a semiconductor storage device, a magnetic storage device, and an optical storage device. The storage device may include registers, a cache memory, or a memory, such as a read only memory (ROM) and a random access memory (RAM), that is used as a main storage device.

Functions of the controller 30, which will be described below, are achieved by, for example, the processor of the controller 30 executing computer programs stored in the storage device.

Note that the controller 30 may be formed by use of dedicated hardware for executing each type of information processing that will be described below.

For example, the controller 30 may include functional logic circuits that are set in a general-purpose semiconductor integrated circuit. For example, the controller 30 may have a programmable logic device (PLD), such as a field-programmable gate array (FPGA), or the like.

Figure 2:
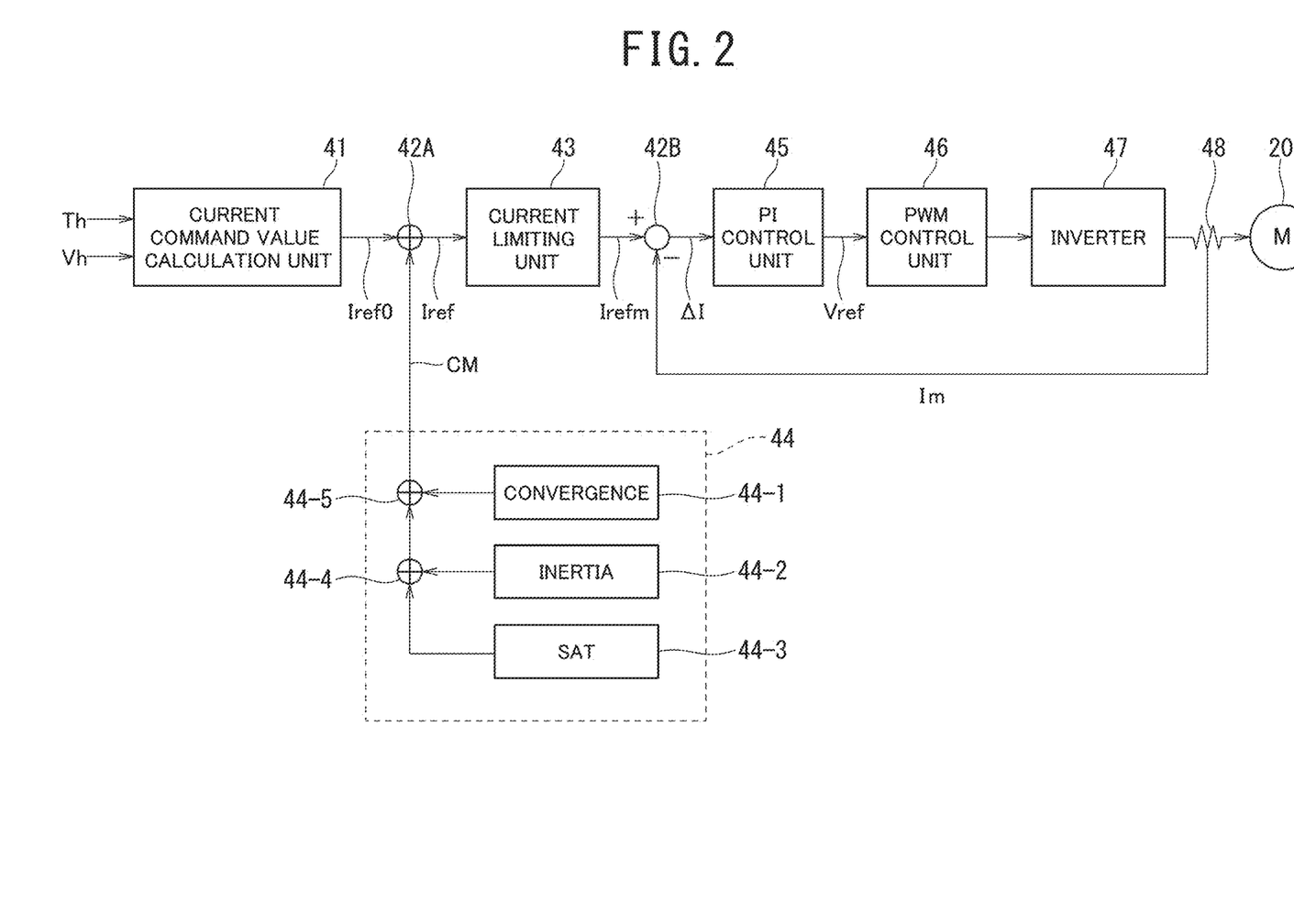
FIG. 2 is a block diagram illustrative of an example of a functional configuration of a steering assist function performed by a controller illustrated in FIG. 1.

Next, with reference to FIG. 2, an example of a functional configuration of a steering assist function performed by the controller 30 will be described.

The steering torque Th and the vehicle speed Vh are input to a current command value calculation unit 41 configured to calculate a current command value Iref0. The current command value calculation unit 41 calculates the current command value Iref0 that is a control target value of current to be supplied to the motor 20, using an assist map or the like, based on the input steering torque Th and vehicle speed Vh.

An adder 42A adds a compensation signal CM from a compensation signal generation unit 44 to the current command value Iref0 and thereby calculates a current command value Iref=Iref0+CM, and inputs the current command value Iref to a current limiting unit 43. A characteristic compensation of the steering system is performed by adding the compensation signal CM, and convergence, an inertia characteristic, and the like are improved. The compensation signal generation unit 44 adds convergence 44-1, inertia 44-2, and self-aligning torque (SAT) 44-3 to one another by adders 44-4 and 44-5 and thereby calculates the compensation signal CM.

A current command value Irefm the maximum current of which is limited by the current limiting unit 43 is input to a subtracter 42B, deviation ΔI (=Irefm−Im) between the current command value Irefm and a fed-back motor current value Im is calculated, and the deviation ΔI is input to a proportional-integral (PI) control unit 45 for characteristic improvement in steering operation. A voltage control command value Vref the characteristics of which have been improved in the PI control unit 45 is input to a PWM control unit 46, and further, the motor 20 is PWM-driven via an inverter 47 serving as a driving unit. The current value Im of the motor 20 is detected by a motor current detector 48 and fed back to the subtracter 42B.

Note that the controller 30 may perform vector control in which a q-axis current command value that is a component for generating torque and a d-axis current command value that is a component for generating a magnetic field are calculated as the current command values Iref and a voltage command value is generated based on deviation between a motor current detected value of the q-axis and the q-axis current command value and deviation between a motor current detected value of the d-axis and the d-axis current command value.

Figure 3:
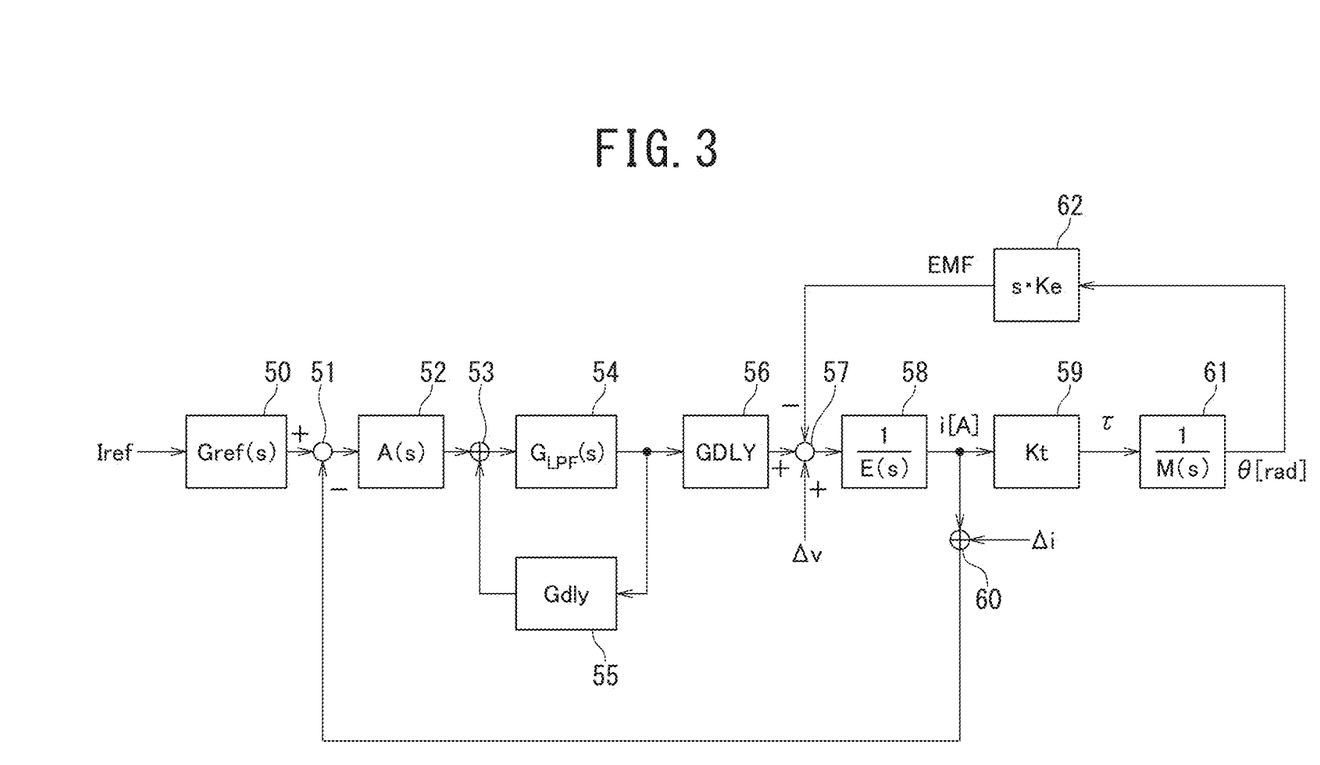
FIG. 3 is a block diagram in which a first example of a system in which a motor is driven based on a current command value is represented by transfer functions.

FIG. 3 is a block diagram in which a system in which the motor 20 is driven based on the current command value Iref is represented by transfer functions. The current command value Iref goes through a control filter (Gref(s)) 50 and is input to a subtracter 51, and the subtracter 51 calculates deviation between output from the control filter 50 and the current value Im of the motor 20 detected by the motor current detector 48. A control filter (A(s)) 52 calculates a first voltage command value according to the deviation between the output from the control filter 50 and the current value Im of the motor 20 and inputs the calculated first voltage command value to an adder 53. The control filter 52 is an example of a "current control unit" described in the claims.

The adder 53 calculates a second voltage command value by adding output from the adder 53 that is delayed by a delay element (Gdly) 55 to the first voltage command value and integrating the first voltage command value. The adder 53 is an example of a "voltage disturbance control unit" described in the claims.

The delay element 55 may be a delay element that provides a delay equivalent to, for example, a length of the control cycle in current control of motor current of the motor 20 performed by the controller 30. For example, the adder 53 calculates the second voltage command value by adding an output value from the adder 53 in a previous cycle in the current control to the first voltage command value in a current cycle.

The output from the adder 53 goes through a filter ($G_{LPF}(s)$) 54 configured to reduce noise in the second voltage command value and is input to the delay element 55 and a delay element (GDLY) 56. That is, the filter 54 is a filter configured to reduce noise in an added value of the first voltage command value and the output from the delay element 55. The filter 54 may be, for example, a low-pass filter. When detected noise in the current value Im of the motor 20 detected by the motor current detector 48 is negligible, the filter 54 may be omitted.

The delay element 56 may be a delay element that provides a delay equivalent to a hardware delay in the controller 30. For example, the delay provided by the delay element 56 may be a delay after the current value Im of the motor 20 is detected by the motor current detector 48 until a PWM signal from the PWM control unit 46 is output using the detected current value Im.

From and to the output from the delay element 56, back electromotive voltage EMF of the motor is subtracted and disturbance voltage $\Delta v$ is also added by a calculation unit 57. The calculation unit 57 is a calculation unit implemented by modeling influence of back electromotive voltage EMF actually occurring in the motor on the output (control voltage) from the delay element 56.

A calculation result of the calculation unit 57 is converted to motor current i by being divided by impedance $E(s) = L \cdot s + R$ of the motor 20 by an electrical characteristic unit ($1/E(s)$) 58 of the motor 20. Note that the constants L and R are an inductance value and a resistance value of the motor 20, respectively.

The motor current i is converted to torque $\tau$ by being multiplied by a torque coefficient (Kt) 59. The torque $\tau$ is converted to a motor rotation angle $\theta$ by a mechanical characteristic unit ($1/M(s)$) 61. A denominator of a transfer function of the mechanical characteristic unit 61 is, for example, $M(s) = Js^2 + (D + G_{CF})s + K$, where the constants J, D, $G_{CF}$, and K are an inertia moment, a viscosity coefficient, a coulomb friction coefficient, and a spring coefficient of the motor, respectively.

A back electromotive force generation unit ($s \cdot Ke$) 62 generates back electromotive voltage EMF of the same magnitude as a product of a time derivative of the motor rotation angle $\theta$ (that is, motor rotational speed) multiplied by a back electromotive voltage constant Ke.

Although the motor current i is detected by the motor current detector 48 and fed back to the subtracter 51, the motor current i is fed back as motor current $Im = i + \Delta i$ by current detection error $\Delta i$ being mixed into the motor current i by an addition unit 60.

A transfer function having the current command value Iref, the disturbance voltage $\Delta v$, the current detection error $\Delta i$, disturbance torque $\Delta \tau$, and a disturbance angle $\Delta \theta$ of the motor rotation angle as inputs and the motor current i as an output is expressed by the following formula (1).

[Math. 1]

$$i = \frac{A(s)G_{LPF}(s)GDLY}{(1 - G_{LPF}(s)Gdly)E(s) + A(s)G_{LPF}(s)GDLY + \frac{(1 - G_{LPF}(s)Gdly)KeKts}{M(s)}} \begin{bmatrix} Gref \\ \left(\frac{1 - G_{LPF}(s)Gdly}{A(s)G_{LPF}(s)GDLY}\right) \\ (1) \\ \left[\left\{\frac{1 - G_{LPF}(s)Gdly}{A(s)G_{LPF}(s)GDLY} + \frac{1}{E(s)}\right\}\left(\frac{E(s)}{Kt}\right)\right] \\ (0) \end{bmatrix}^T \begin{bmatrix} Iref \\ \Delta v \\ \Delta i \\ \Delta \tau \\ \Delta \theta \end{bmatrix} \quad (1)$$

Note that within a term on the right-hand side of the above formula (1), a portion

[Math. 2]

$$\begin{bmatrix} Iref \\ \Delta v \\ \Delta i \\ \Delta \tau \\ \Delta \theta \end{bmatrix}$$

is sometimes referred to as "input vector" in the following description. In addition, a portion within the term on the right-hand side of the above formula (1) that indicates influence of physical characteristics of the motor 20 and that is common to elements in the input vector

[Math. 3]

$$\frac{A(s)G_{LPF}(s)GDLY}{(1 - G_{LPF}(s)Gdly)E(s) + A(s)G_{LPF}(s)GDLY + \frac{(1 - G_{LPF}(s)Gdly)KeKts}{M(s)}}$$

is sometimes referred to as "common term" in the following description. In addition, a portion within the term on the right-hand side of the above formula (1) that indicates influence of each element in the input vector

[Math. 4]

$$\begin{bmatrix} Gref \\ \left(\frac{1 - G_{LPF}(s)Gdly}{A(s)G_{LPF}(s)GDLY}\right) \\ (1) \\ \left[\left\{\frac{1 - G_{LPF}(s)Gdly}{A(s)G_{LPF}(s)GDLY} + \frac{1}{E(s)}\right\}\left(\frac{E(s)}{Kt}\right)\right] \\ (0) \end{bmatrix}^T$$

is sometimes referred to as "sensitivity vector" in the following description. Note that in the above formula (1), a component in the sensitivity vector corresponding to the disturbance angle Δθ is assumed to be "0", based on the assumption that influence of the disturbance angle Δθ is negligible.

In the present embodiment, a characteristic of a transfer function of the control filter 52 is set in such a way that variation in a frequency response of a transfer function obtained by removing the transfer function (GDLY) of the delay element 56 and the transfer function ($G_{LPF}(s)$) of the filter 54 from a numerator of the common term in the above formula (1)

[Math. 5]

$$\frac{A(s)}{(1-G_{LPF}(s)Gdly)E(s)+A(s)G_{LPF}(s)GDLY+\dfrac{(1-G_{LPF}(s)Gdly)KeKts}{M(s)}}$$

is small (that is, the transfer function has a flat frequency characteristic) and a transfer function of a component representing influence of the disturbance voltage Δv on the motor current i

[Math. 6]

$$\frac{A(s)G_{LPF}(s)GDLY}{(1-G_{LPF}(s)Gdly)E(s)+A(s)G_{LPF}(s)GDLY+\dfrac{(1-G_{LPF}(s)Gdly)KeKts}{M(s)}}\left(\frac{1-G_{LPF}(s)Gdly}{A(s)G_{LPF}(s)GDLY}\right)$$

has a characteristic of a high-pass filter (that is, the transfer function has a characteristic of attenuating low frequency components).

The transfer function of the control filter (A(s)) 52 may be set as, for example, the following formula.

[Math. 7]

$$A(s)=Kp\left(1+\frac{\omega c}{2\zeta s}+\frac{s}{2\zeta \omega c}\right)$$

The above formula is an example of a formula representing a PID (proportional-integral-derivative) controller, and characteristics of the transfer function of the control filter 52 can be appropriately adjusted by changing, for example, parameters Kp, ζ, and ωc.

When the transfer function of the control filter 52 is set in this way, variation in a frequency response of the transfer function obtained by removing the transfer function (GDLY) of the delay element 56 and the transfer function ($G_{LPF}(s)$) of the filter 54 from the numerator of the common term becomes small, and an excellent response characteristic that is hardly influenced by frequency of the current command value Iref can be achieved.

In addition, when the vector control is performed, back electromotive voltage and an interference term between a d-axis component and a q-axis component can be treated as a signal that has a low frequency (for example, less than or equal to 10 Hz) approximately equal to a steering frequency of the steering wheel 1 in a dq-axis rotational coordinate system. Thus, the feature that the transfer function of the component representing influence of the disturbance voltage Δv on the motor current i has a characteristic of a high-pass filter with a cutoff frequency that attenuates low frequency components enables influence of the back electromotive voltage and other disturbance voltages to be suppressed.

Figure 4A:
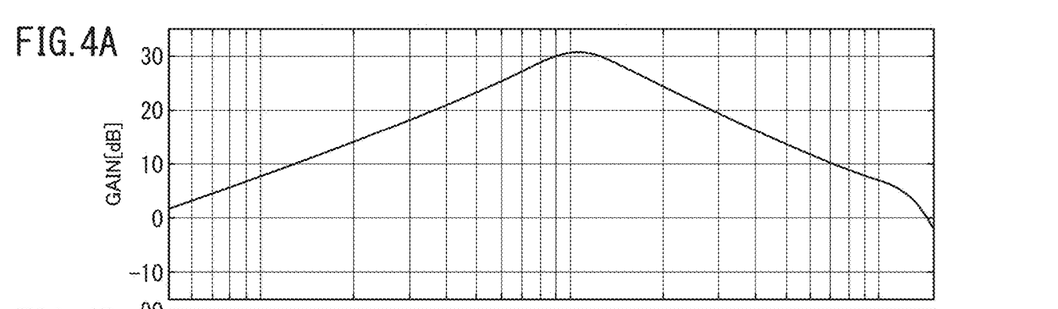
FIGS. 4A and 4B are a Bode plot of an example of a frequency characteristic when a numerator of a common term in a transfer function of the system in FIG. 3 is set to 1.
Figure 4B:
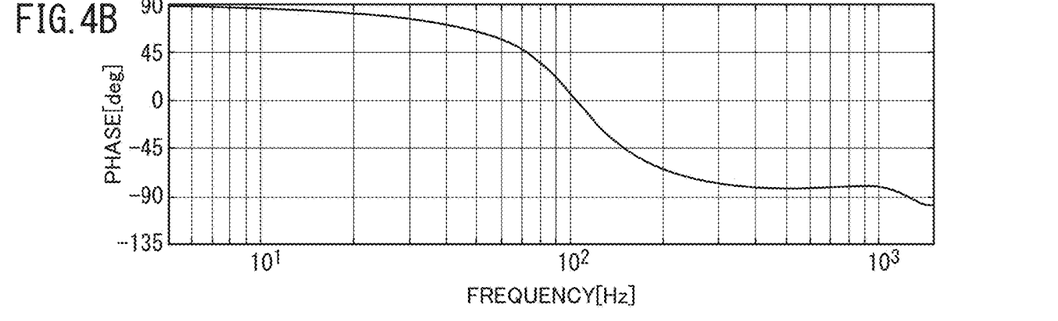

For example, when a transfer function when the numerator of the common term in the transfer function expressed by the above formula (1) is replaced by 1

[Math. 8]

$$\frac{1}{(1-G_{LPF}(s)Gdly)E(s)+A(s)G_{LPF}(s)GDLY+\dfrac{(1-G_{LPF}(s)Gdly)KeKts}{M(s)}}$$

has a frequency characteristic illustrated as an example in FIGS. 4A and 4B, in order to reduce variation in the frequency response of the transfer function obtained by removing the transfer functions of the delay element 56 and the filter 54 (GDLY and $G_{LPF}(s)$) from the numerator of the common term

[Math. 9]

$$\frac{A(s)}{(1-G_{LPF}(s)Gdly)E(s)+A(s)G_{LPF}(s)GDLY+\dfrac{(1-G_{LPF}(s)Gdly)KeKts}{M(s)}},$$

the transfer function A(s) of the control filter 52 is set in such a way that the transfer function A(s) has an inverse characteristic to the frequency characteristic illustrated as an example in FIGS. 4A and 4B.

Figure 5A:
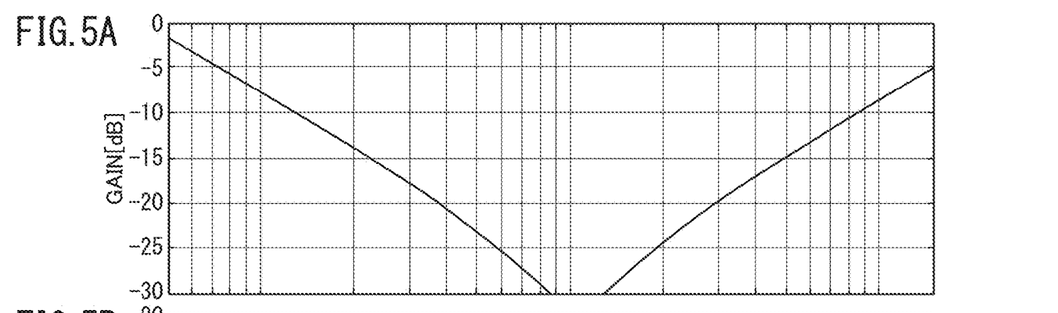
FIGS. 5A and 5B are a Bode plot of an example of a control filter 52 in FIG. 3.
Figure 5B:
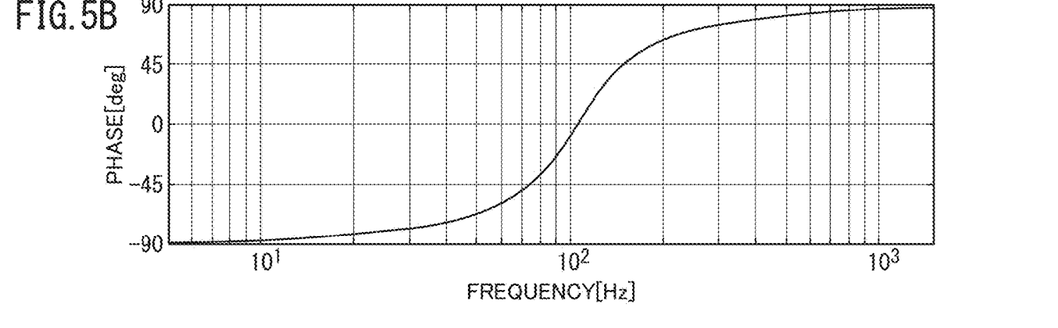

FIGS. 5A and 5B are a Bode plot of an example of the control filter 52 that is set in such a way as to have an inverse characteristic to the frequency characteristic of the denominator of the common term.

Figure 6A:
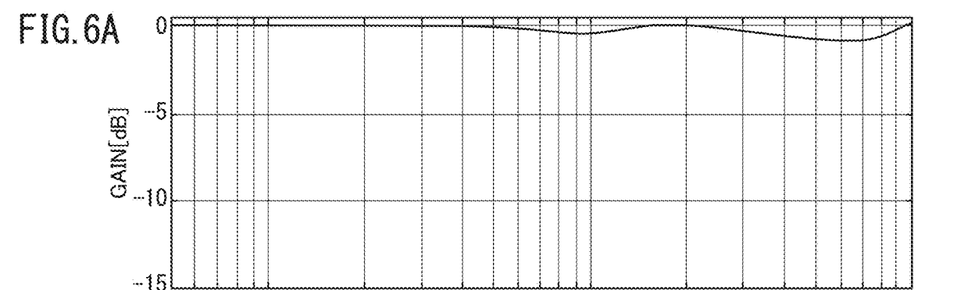
FIGS. 6A and 6B are a Bode plot of an example of a transfer function obtained by removing transfer functions of a delay element 56 and a filter 54 from the numerator of the common term in the transfer function of the system in FIG. 3.
Figure 6B:
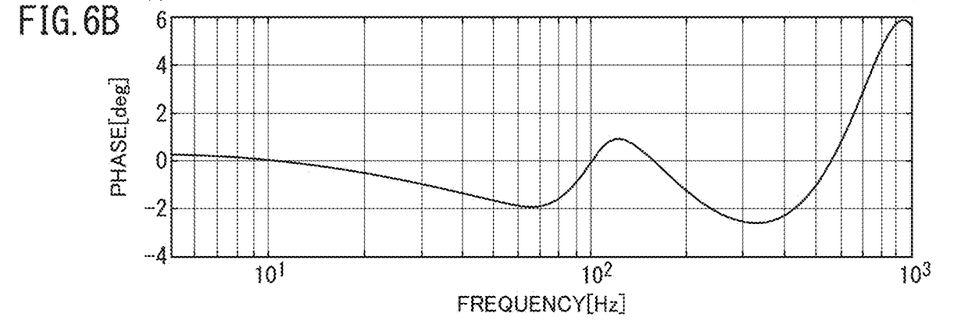

When the frequency characteristic of the control filter 52 is set as illustrated in FIGS. 5A and 5B, the frequency characteristic of the transfer function obtained by removing the transfer functions of the delay element 56 and the filter 54 (GDLY and $G_{LPF}(s)$) from the numerator of the common term becomes a frequency characteristic as illustrated in FIGS. 6A and 6B.

As illustrated in FIGS. 6A and 6B, variation in the frequency response of the transfer function obtained by removing the transfer functions of the delay element 56 and the filter 54 (GDLY and $G_{LPF}(s)$) from the numerator of the common term is suppressed, and a comparatively flat frequency characteristic is achieved.

In addition, when the frequency characteristic of the control filter 52 is set as illustrated in FIGS. 5A and 5B, the transfer function of the component representing the influence of the disturbance voltage Δv on the motor current i

Figure 7A:
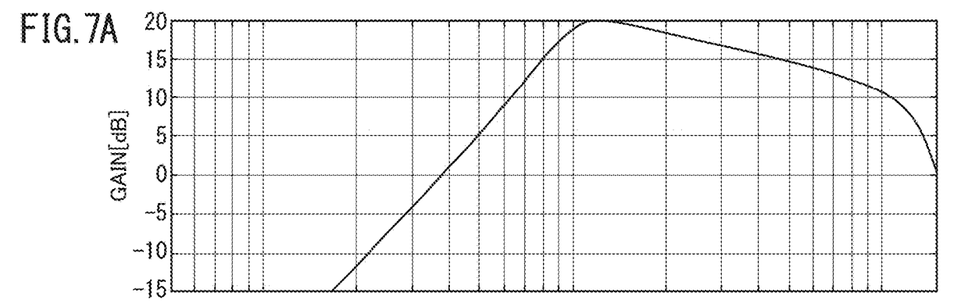
FIGS. 7A and 7B are a Bode plot of an example of a transfer function of a component representing influence of disturbance voltage $\Delta v$ on motor current i.
Figure 7B:
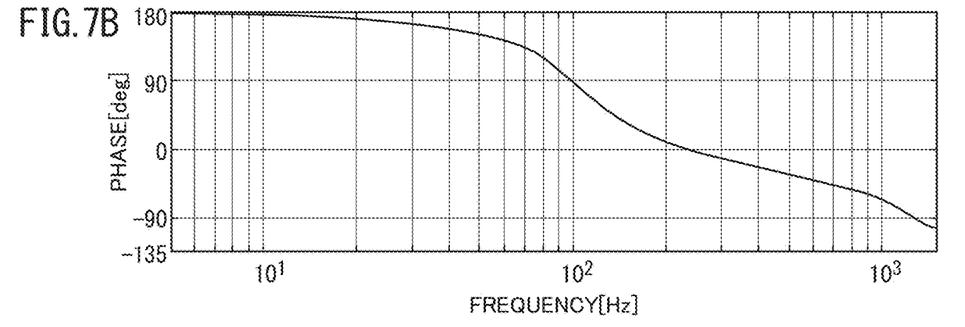

[Math. 10]

$$\frac{A(s)G_{LPF}(s)GDLY}{(1-G_{LPF}(s)Gdly)E(s)+A(s)G_{LPF}(s)GDLY+\dfrac{(1-G_{LPF}(s)Gdly)KeKts}{M(s)}}\left(\frac{1-G_{LPF}(s)Gdly}{A(s)G_{LPF}(s)GDLY}\right)$$

becomes a transfer function as illustrated in FIGS. 7A and 7B. The feature that the transfer function of the component representing the influence of the disturbance voltage Δv on the motor current i has a characteristic of a high-pass filter enables influence of the back electromotive voltage and other disturbance voltages to be suppressed, as described above.

Figure 8A:
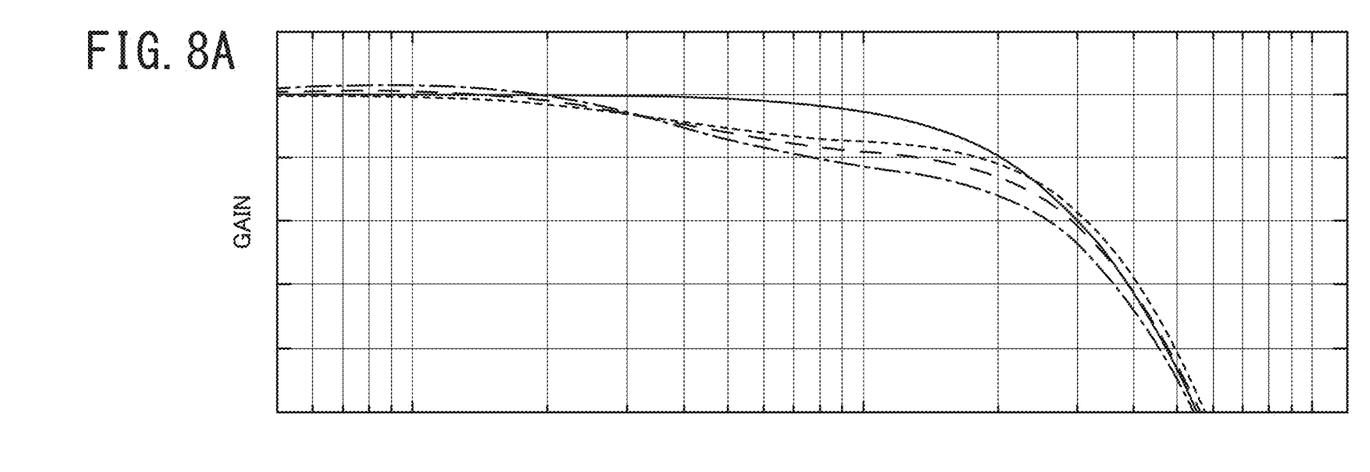
FIGS. 8A and 8B are a Bode plot illustrative of a simulation result of a comparative example.
Figure 8B:
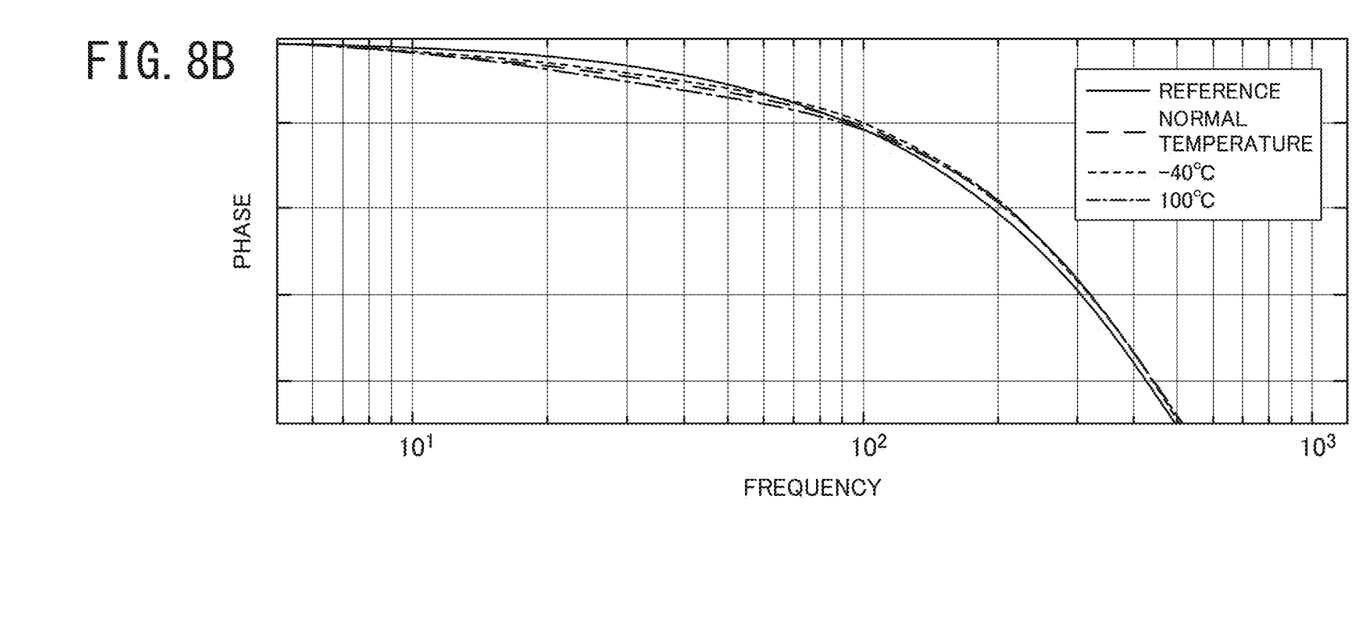

Next, with reference to FIGS. 8A, 8B, 9A, and 9B, advantageous effects of the embodiment will be described. FIGS. 8A and 8B are a Bode plot illustrative of simulation results of the frequency characteristic of the motor current i with respect to the current command value Iref when a conventional feedforward-type back electromotive voltage compensation is performed as a comparative example, and FIGS. 9A and 9B are a Bode plot illustrative of simulation results of the frequency characteristic of the motor current i with respect to the current command value Iref when the motor current control by the controller 30 of the embodiment is performed.

Solid lines indicate reference frequency characteristics, dashed lines indicate frequency characteristics at a normal temperature, dotted lines indicate frequency characteristics at −40° C., and dashed-dotted lines indicate frequency characteristics at 100° C.

Figures 9A, 9B:
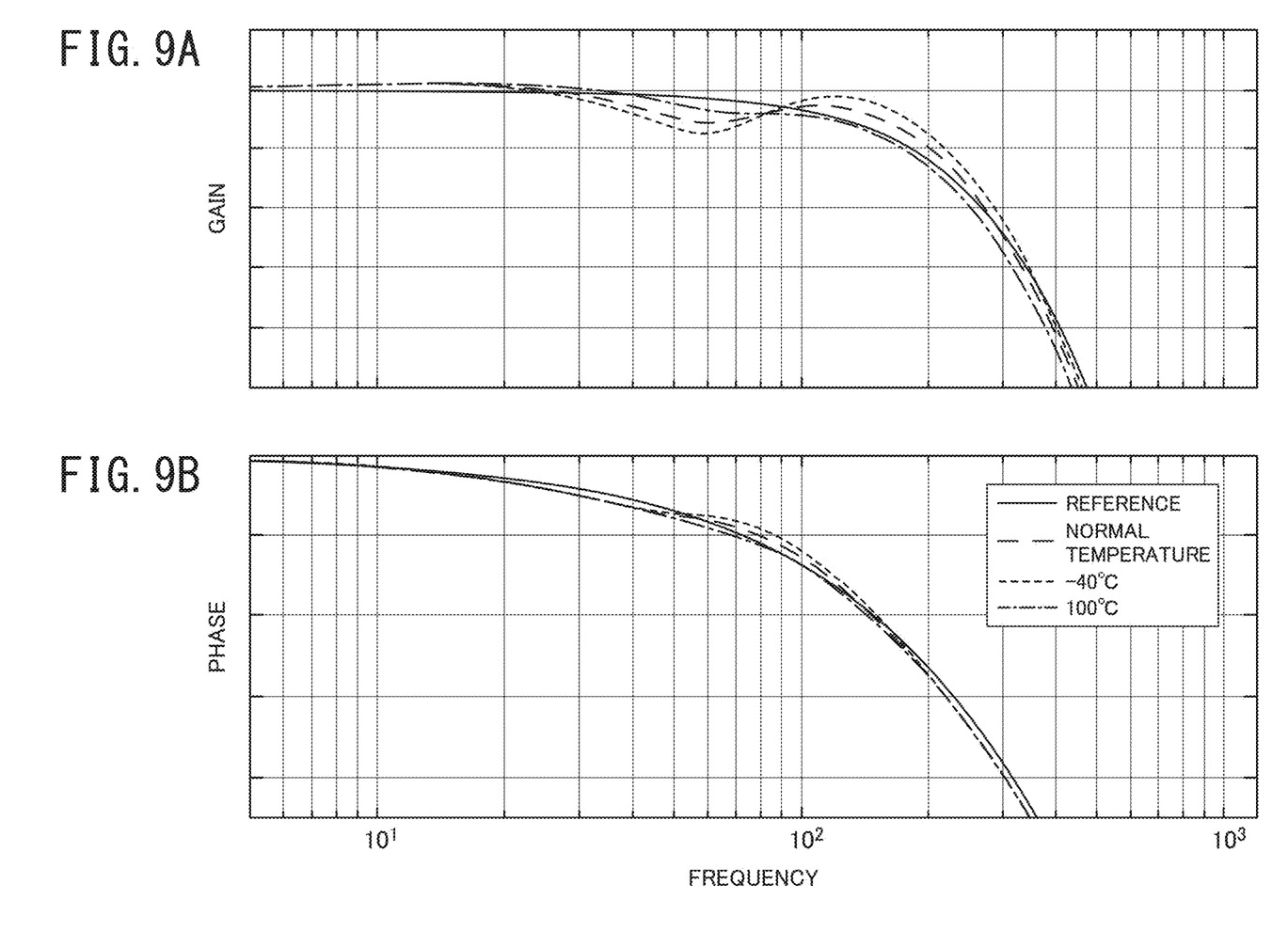
FIGS. 9A and 9B are a Bode plot illustrative of a simulation result of the embodiment.

When FIG. 8A and FIG. 9A are compared, it is revealed that while in the case where the conventional feedforward-type back electromotive voltage compensation is performed, reductions in the gain occur in a frequency band lower than or equal to 100 Hz due to influence of a low-pass filter suppressing influence of current detection noise, in the case where the motor current control according to the embodiment is performed, reductions in the gain are suppressed in the frequency band less than or equal to 100 Hz.

In addition, it is also revealed that in the case where the motor current control according to the embodiment is performed, change in the gain in association with change in temperature is suppressed in the low frequency band. In addition, the higher the temperature is, the better variation in the gain is suppressed. An electric actuator product and an electric power steering device are often operated in normal temperature conditions or high temperature conditions rather than in extremely low temperature conditions since the electric actuator product and the electric power steering device generate heat by themselves due to energization. Characteristics of the motor current control of the embodiment are characteristics suitable for such operation conditions.

(Variation 1)

Figure 10:
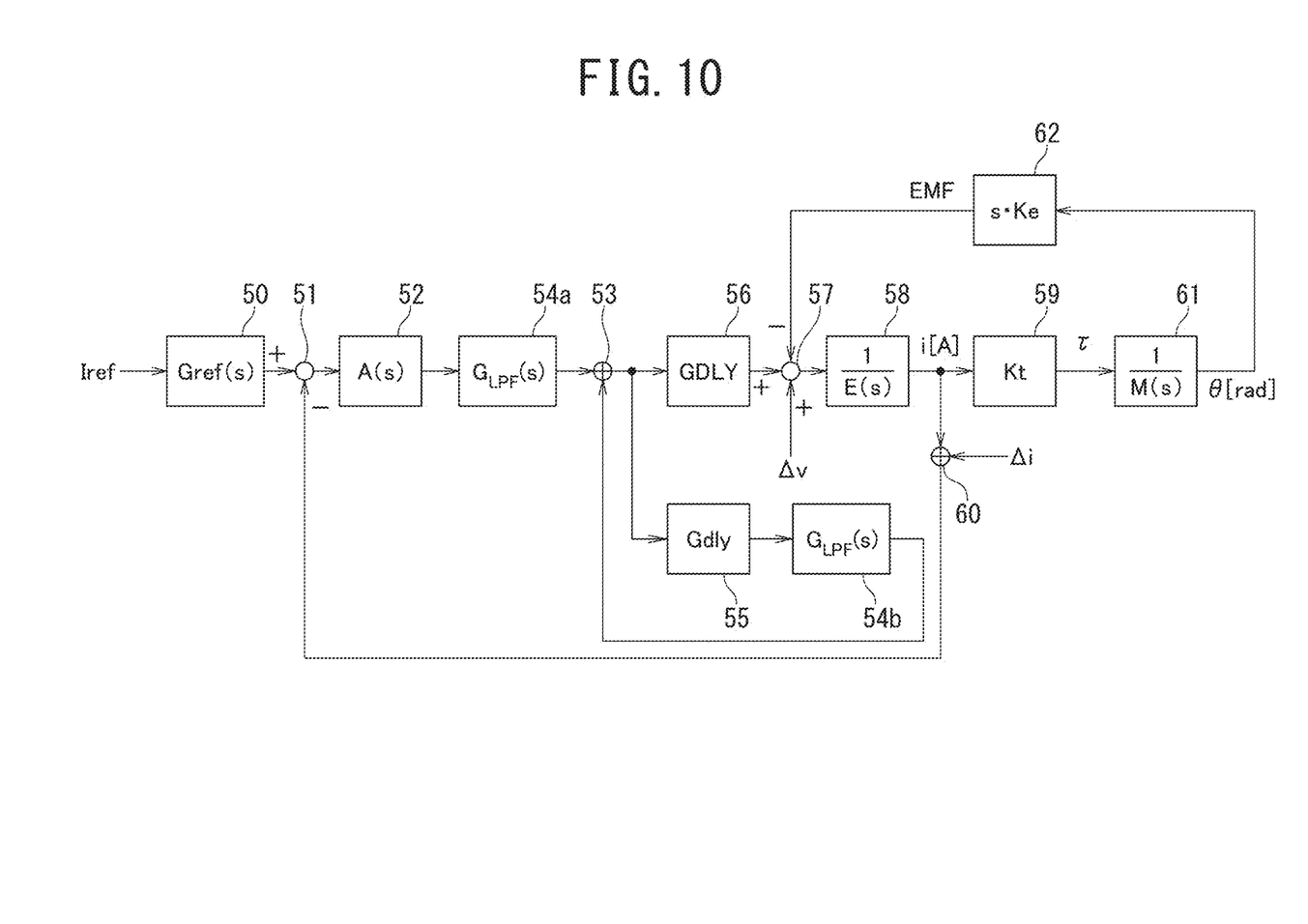
FIG. 10 is a block diagram in which a second example of the system in which the motor is driven based on the current command value is represented by transfer functions.

FIG. 10 is a block diagram in which a second example of the system in which the motor 20 is driven based on the current command value Iref is represented by transfer functions. The system of the second example may separately include, in place of the filter ($G_{LPF}(s)$) 54 in FIG. 3, a filter ($G_{LPF}(s)$) 54a configured to reduce noise in the output from the control filter (A(s)) 52 (that is, the first voltage command value) and a filter ($G_{LPF}(s)$) 54b configured to reduce noise in the output from the delay element ($G_{dly}$) 55.

For example, it may be configured such that by arranging the filter 54a between the control filter 52 and the adder 53 and also arranging the filter 54b between the delay element 55 and the adder 53, the first voltage command value having noise reduced by the filter 54a and the output from the delay element 55 having noise reduced by the filter 54b are added to each other by the adder 53 and the second voltage command value is thereby calculated.

In addition, it may be configured such that the filter 54a is arranged at the preceding stage of the control filter 52 and the output from the subtracter 51 having noise reduced by the filter 54a is input to the control filter 52. Such a configuration enables noise in the output from the control filter 52 (that is, the first voltage command value) to be reduced by the filter 54a.

Likewise, it may be configured such that the filter 54b is arranged at the preceding stage of the delay element 55 and the output from the adder 53 having noise reduced by the filter 54b is input to the delay element 55. Such a configuration enables noise in the output from the delay element 55 to be reduced by the filter 54b.

(Variation 2)

Figure 11:
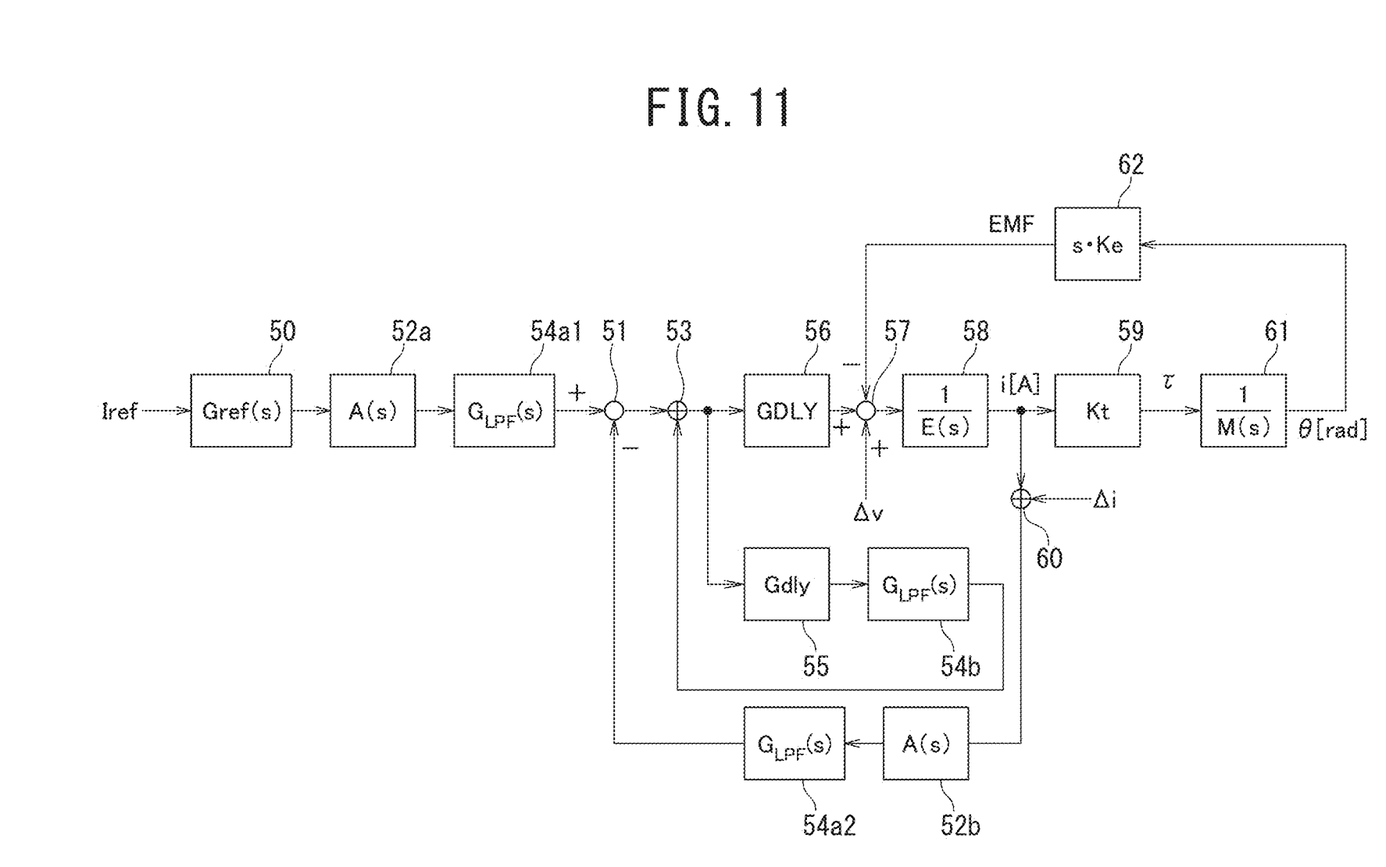
FIG. 11 is a block diagram in which a third example of the system in which the motor is driven based on the current command value is represented by transfer functions.

FIG. 11 is a block diagram in which a third example of the system in which the motor 20 is driven based on the current command value Iref is represented by transfer functions.

In place of the control filter (A(s)) 52 in FIG. 10, a control filter (A(s)) 52a similar to the control filter 52 may be disposed at the preceding stage of the subtracter 51 (that is, between the control filter (Gref(s)) 50 and the subtracter 51), and a control filter (A(s)) 52b similar to the control filter 52 may also be disposed in a feedback path of the current value Im detected by the motor current detector 48 (that is, between the motor current detector 48 and the subtracter 51). Such a configuration is equivalent to the transfer function of the system illustrated in FIG. 10.

In addition, the system of the third example may separately include, in place of the filter ($G_{LPF}(s)$) 54a, a filter ($G_{LPF}(s)$) 54a1 configured to reduce noise in the output from the control filter 52a and a filter ($G_{LPF}(s)$) 54a2 configured to reduce noise in the output from the control filter 52b. The filter 54a1 reduces noise in the current command value Iref, and the filter 54a2 reduces noise in the current detected value Im.

A sequence of connection of the control filter 50, the control filter 52a, and the filter 54a1 is not limited to the sequence in FIG. 11, and, for example, it may be configured such that the filter 54a1 is disposed at the succeeding stage of the control filter 50 to which the current command value Iref is input and the control filter 52a is also disposed at the succeeding stage of the filter 54a1 and the output from the control filter 52a is input to the subtracter 51.

In addition, it may be configured such that the control filter 50 is disposed at the succeeding stage of the control filter 52a to which the current command value Iref is input and the filter 54a1 is also disposed at the succeeding stage of the control filter 50 and the output from the filter 54a1 is input to the subtracter 51, or it may be configured such that the filter 54a1 is disposed at the succeeding stage of the control filter 52a to which the current command value Iref is input and the control filter 50 is also disposed at the succeeding stage of the filter 54a1 and the output from the control filter 50 is input to the subtracter 51.

In addition, it may be configured such that the control filter 50 is disposed at the succeeding stage of the filter 54a1 to which the current command value Iref is input and the control filter 52a is also disposed at the succeeding stage of the control filter 50 and the output from the control filter 52a is input to the subtracter 51, or it may be configured such that the control filter 52a is disposed at the succeeding stage of the filter 54a1 to which the current command value Iref is input and the control filter 50 is also disposed at the succeeding stage of the control filter 52a and the output from the control filter 50 is input to the subtracter 51.

In addition, an arrangement sequence of the control filter 52b and the filter 54a2 in the feedback path of the current value Im is not limited to the sequence in FIG. 11, and, for example, it may be configured such that current value Im detected by the motor current detector 48 is input to the filter 54a2, the control filter 52b is disposed at the succeeding stage of the filter 54a2, and the output from the control filter 52b is input to the subtracter 51.

In addition, although both the control filter (A(s)) and the filter ($G_{LPF}(s)$) are arranged at the preceding stage of the subtracter 51 and in the feedback path of the current value Im, only one of the control filter (A(s)) and the filter ($G_{LPF}(s)$) may be arranged at the preceding stage of the subtracter 51 and in the feedback path of the current value Im and the other filter may be arranged at the succeeding stage of the subtracter 51.

Advantageous Effects of Embodiment (1) The motor control device of the embodiment includes: the current command value calculation unit 41 configured to calculate a current command value Iref for driving the motor 20; the current value detection unit 48 configured to detect current flowing through the motor 20; the control filter 52 configured to output a first voltage command value according to deviation between a current detected value Im, the current detected value Im being a detected value of current detected by the current value detection unit 48, and the current command value Iref; the adder 53 configured to calculate a second voltage command value by adding output from the delay element 55 to the first voltage command value and also input the second voltage command value to the delay element 55; and the inverter 47 configured to drive the motor 20, based on the second voltage command value.

Although the conventional feedforward-type back electromotive voltage compensation requires a model of motor characteristics, such as a back electromotive voltage constant, such a model is not used in the present invention. Since because of this configuration, even when the back electromotive voltage constant changes due to variation in motor characteristics caused by an individual difference of a motor to be used, change in physical properties due to temperature change or aging, or the like, disturbance voltage generated by the change in the back electromotive voltage constant can be suppressed, robustness against disturbance factors can be improved.

In addition, although since motor rotational speed to be used for the conventional feedforward-type back electromotive voltage compensation is calculated from a sampling value of a motor angle, there is a risk that estimation error occurs influenced by detection error, detection noise, or the like, in the present invention, since the motor rotational speed is not used for control of disturbance voltage, influence of detection error or detection noise in the motor rotational speed can be avoided.

Note that when a voltage command value is calculated by the vector control as described above, the current command value calculation unit 41 may calculate a d-axis current command value and a q-axis current command value. The current detected value Im may be converted to a motor current detected value of the q-axis and a motor current detected value of the d-axis. The control filter (current control unit) 52 may calculate the first voltage command value according to deviation between the motor current detected value of the q-axis and the q-axis current command value and deviation between the motor current detected value of the d-axis and the d-axis current command value.

(2) The control filter 52 may have a characteristic of a high-pass filter with respect to disturbance voltage applied to the motor 20.

As described above, back electromotive voltage and an interference term between a d-axis component and a q-axis component can be treated as a signal that has a low frequency approximately equal to a steering frequency of the steering wheel 1 in a dq-axis rotational coordinate system. The feature that the control filter 52 has a characteristic of a high-pass filter with respect to disturbance voltage enables influence of back electromotive voltage and other disturbance voltages to be suppressed.

(Variation)

The motor control device according to the present invention is not limited to the above-described embodiment, and various modification can be made without departing from the spirit and scope of the present invention.

For example, although in the above-described embodiment, as an application example of the motor control device according to the present invention, the electric power steering device 10 including the motor control device was described as an example, a scope of application of the motor control device according to the present invention is not limited to the electric power steering device and is applicable to various types of mechanical devices using a motor control device.

Figure 12:
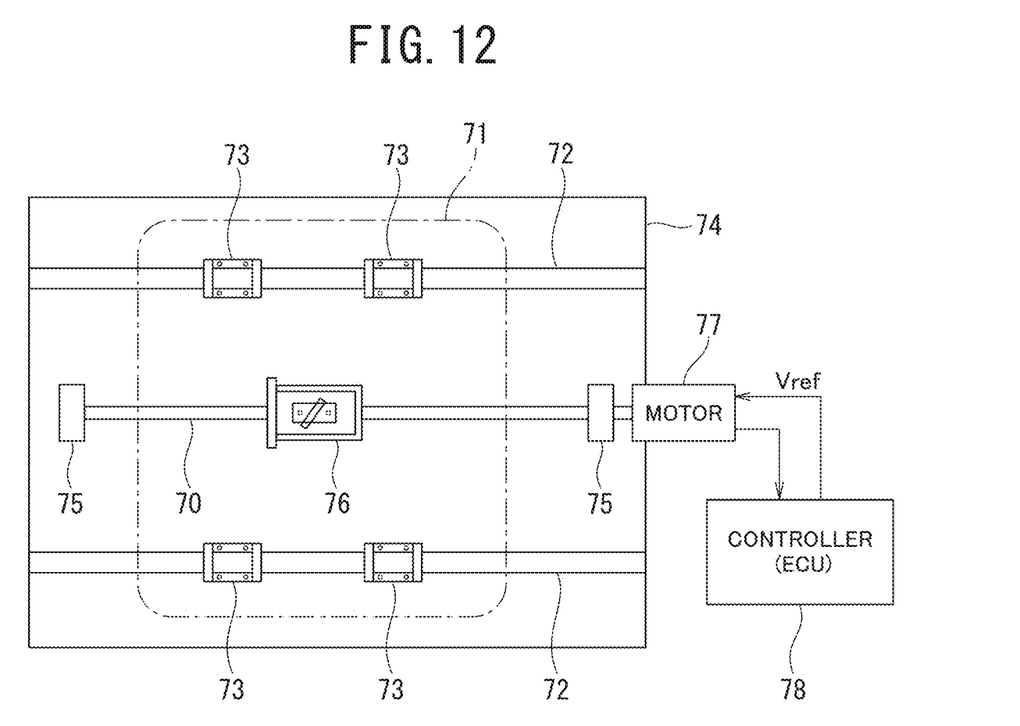
FIG. 12 is a configuration diagram illustrative of an outline of an example of a linear motion table device in which the motor control device of the present invention is used.

FIG. 12 is a configuration diagram illustrative of an outline of an example of a linear motion table device in which the motor control device of the present invention is used.

The linear motion table device includes a feed screw device, a table 71, two linear guides (linear motion guide devices), and a base 74.

The feed screw device includes a screw shaft 70, a nut 76, and a motor 77, and the screw shaft 70 is inserted into the nut 76. A feed screw mechanism in the feed screw device is a ball screw in which a spiral groove of the screw shaft 70 and a spiral groove of the nut 76 come into point contact with each other via balls (rolling elements). The motor 77 is coupled to one end in the axial direction of the screw shaft 70.

Each of the two linear guides includes a guide rail 72, two sliders (mobile units) 73, and a plurality of rolling elements. In each linear guide, the guide rail 72 and each of the sliders 73 have raceway surfaces that form rolling paths for the rolling elements at positions facing each other. Both raceway surfaces extend in the longitudinal direction of the guide rail 72, and the sliders 73 linearly move along the guide rail 72 via the rolling elements rolling in the rolling paths while being loaded.

The linear guides are arranged at both ends in a direction perpendicular to a movement direction Y of the table 71 on the base 74, and the feed screw device is arranged between the two linear guides. The guide rails 72 and the screw shaft 70 are arranged in parallel with the movement direction Y of the table 71.

In the arrangement, the guide rails 72 are fixed to the base 74. Rolling bearings are attached at both ends in the axial direction of the screw shaft 70, a housing 75 is fixed to an outer ring of each of the rolling bearings, and each of the housing 75 is fixed to the base 74. Because of this configuration, the screw shaft 70 is rotatably supported with respect to the base 74.

The table 71 is arranged above the two sliders 73 of each of the linear guides and the nut 76 of the feed screw device, and is directly fixed to the sliders 73 and is fixed to the nut 76 via a bracket. That is, the two sliders 73 of each of the linear guides and the nut 76 of the feed screw device are fixed to one surface of the table 71.

In the linear motion table, when the motor 77 is driven and the feed screw device is operated, the screw shaft 70 rotates and the nut 76 linearly moves by the ball screw mechanism.

In association with this movement, the table 71 linearly moves while being guided by the linear guides.

A controller 78 sets current command values to drive the motor 77 and, by performing the same processing as the processing performed by the controller 30 of the above-described embodiment, calculates voltage control command values Vref from the current command values and controls currents to be supplied to the motor 77.

REFERENCE SIGNS LIST

- 1 Steering wheel
- 2 Steering shaft
- 3 Reduction gear
- 4a, 4b Universal joint
- 5 Pinion rack mechanism
- 5a Pinion
- 5b Rack
- 6a, 6b Tie rod
- 7a, 7b Hub unit
- 8L, 8R Steered wheel
- 10 Torque sensor
- 11 Ignition Key
- 12 Vehicle speed sensor
- 13 Battery
- 14 Steering angle sensor
- 20 Steering assist motor
- 20, 77 Motor
- 30, 78 Controller
- 41 Current command value calculation unit
- 42A, 44-4, 44-5, 53 Adder
- 42B, 51 Subtracter
- 43 Current limiting unit
- 44 Compensation signal generation unit
- 44-1 Convergence
- 44-2 Inertia
- 44-3 Self-aligning torque
- 45 (Proportional-integral) control unit
- 46 PWM control unit
- 47 Inverter
- 48 Motor current detector
- 50, 52, 52a, 52b Control filter
- 53 Voltage disturbance control unit
- 54, 54a, 54a1, 54a2, 54b Filter
- 55, 56 Delay element
- 57 Calculation unit
- 58 Electrical characteristic unit
- 59 Torque coefficient
- 60 Addition unit
- 61 Mechanical characteristic unit
- 62 Back electromotive force generation unit
- 70 Screw shaft
- 71 Table
- 72 Guide rail
- 73 Slider
- 74 Base
- 75 Housing
- 76 Nut

The invention claimed is:

1. A motor control device comprising:
a current command value calculation unit configured to calculate a current command value for driving a motor;
a current value detection unit configured to detect current flowing through the motor;
a current control unit configured to output a first voltage command value according to deviation between a current detected value and the current command value, and having characteristics of proportional control, integral control, and derivative control for the deviation, the current detected value being a detected value of current detected by the current value detection unit;
a voltage disturbance control unit arranged at a succeeding stage of the current control unit and configured to calculate a second voltage command value by adding output from a delay element to the first voltage command value and also input the second voltage command value to the delay element, the delay element providing a delay of a length of one control cycle of the current control unit to an input signal input in a previous control cycle of the current control unit and outputting the input signal as a delay signal in a current control cycle of the current control unit; and
a driving circuit configured to drive the motor, based on the second voltage command value.

2. The motor control device according to claim 1 comprising
a first filter configured to reduce noise in the second voltage command value.

3. The motor control device according to claim 2, wherein the first filter is a filter configured to reduce noise in an added value of the first voltage command value and output from the delay element.

4. The motor control device according to claim 3, wherein an output from the first filter is inputted to the delay element.

5. The motor control device according to claim 2, wherein
the first filter separately includes a second filter configured to reduce noise in the first voltage command value and a third filter configured to reduce noise in the output from the delay element, and
the voltage disturbance control unit calculates the second voltage command value by adding the first voltage command value having noise reduced by the second filter and the output from the delay element having noise reduced by the third filter.

6. The motor control device according to claim 1, wherein the motor control device separately includes a filter configured to reduce noise in the current command value, a filter configured to reduce noise in the current detected value, and a filter configured to reduce noise in output from the delay element.

7. The motor control device according to claim 1, wherein the current control unit has a characteristic of a high-pass filter with respect to disturbance voltage applied to the motor.

8. An electric actuator product comprising:
the motor control device according to claim 1; and
a motor controlled by the motor control device.

9. An electric power steering device comprising:
the motor control device according to claim 1; and
a motor controlled by the motor control device,
wherein the electric power steering device provides a steering system of a vehicle with a steering assist force, using the motor.

* * * * *